United States Patent [19]

Economy et al.

[11] B 4,001,477

[45] Jan. 4, 1977

[54] FLAME RESISTANT CLOTH

[75] Inventors: James Economy, Eggertsville; Francis J. Frechette, Tonawanda; Luis C. Wohrer, Lewiston, all of N.Y.

[73] Assignee: The Carborundum Company, Niagara Falls, N.Y.

[22] Filed: July 12, 1973

[21] Appl. No.: 378,760

[44] Published under the second Trial Voluntary Protest Program on March 9, 1976 as document No. B 378,760.

Related U.S. Application Data

[60] Continuation of Ser. No. 107,484, Jan. 18, 1971, abandoned, which is a division of Ser. No. 764,935, Oct. 3, 1968, Pat. No. 3,628,995.

[52] U.S. Cl. ................... 428/224; 57/140 BY; 66/202; 139/420 R; 428/225; 428/253; 428/921

[51] Int. Cl.² ................. D03D 25/00; D04B 1/16

[58] Field of Search ....... 117/136, 138.8 G, 140 A; 8/115.5; 161/70, 175, 176, 403; 57/140 BY, 144; 428/225, 224; 66/202; 139/420 R

[56] References Cited

UNITED STATES PATENTS

| | | | |
|---|---|---|---|
| 1,309,581 | 7/1919 | Matheson | 117/136 |
| 2,186,917 | 1/1940 | Gaylor | 117/136 |
| 2,217,049 | 10/1940 | Greenleaf | 57/144 |
| 2,312,296 | 2/1943 | Hempel | 117/138.8 |
| 2,378,667 | 6/1945 | Vaala | 260/43 |
| 2,535,373 | 12/1950 | Shearer | 264/126 |
| 2,543,101 | 2/1951 | Francis | 117/140 A |
| 2,782,174 | 2/1957 | Hetherington et al. | 117/136 |
| 2,833,681 | 5/1958 | Nelson et al. | 117/136 |
| 2,939,200 | 6/1960 | Ewing et al. | 161/176 |
| 3,027,222 | 3/1962 | Wilkinson | 161/403 |
| 3,090,103 | 5/1963 | Crawley | 139/420 |
| 3,366,001 | 1/1968 | Meserole | 57/144 |
| 3,507,608 | 4/1970 | Eirich | 161/176 |
| 3,540,452 | 11/1970 | Usher et al. | 161/176 |
| 3,549,474 | 12/1970 | Lonning | 161/403 |
| 3,628,995 | 12/1971 | Economy et al. | 117/138.8 G |
| 3,650,102 | 3/1972 | Economy et al. | 161/172 |
| 3,651,199 | 3/1972 | Blume | 260/57 |
| 3,700,544 | 10/1972 | Matsui | 161/175 |
| 3,716,521 | 2/1973 | Economy et al. | 260/59 |
| 3,723,588 | 3/1973 | Economy et al. | 260/59 |
| 3,808,289 | 4/1974 | Okuhashi et al. | 260/841 |
| 3,848,044 | 11/1974 | Hagiwara et al. | 264/176 F |

FOREIGN PATENTS OR APPLICATIONS

| | | | |
|---|---|---|---|
| 860,045 | 1/1941 | France | 260/59 |

OTHER PUBLICATIONS

Golding, *Polymers and Resins*, Van Nostrand Co., (1959), pp. 243–251.
Pohl, Herbert A., "Reaction Spinning of Fibers," *Textile Research Journal*, pp. 473–477, (1958).
Kaswell, Ernest R., *Wellington Sears Handbook of Industrial Textiles*, (1963), pp. 233 & 234.

*Primary Examiner*—Ralph Husack
*Assistant Examiner*—Janyce A. Bell
*Attorney, Agent, or Firm*—David E. Dougherty; Raymond W. Green

[57] ABSTRACT

A flame resistant cloth or fabric comprising synthetic fibers prepared from resin condensation products of phenols and aldehydes which can be fiberized and cured. These fabrics may include blends of phenolic resin fibers with other fire resistant fibers such as wool, silk, polyamide fibers, polyacrylonitrile fibers, mineral and glass fibers, among others.

6 Claims, No Drawings

FLAME RESISTANT CLOTH

This is a continuation of copending application Ser. No. 107,484, filed Jan. 18, 1971, now abandoned, which is in turn a division of Ser. No. 764,935, filed Oct. 3, 1968, now U.S. Pat. No. 3,628,995.

BACKGROUND OF THE INVENTION

Man's concern with the hazards associated with the ready combustibility of textiles has been continuous since the discovery and utilization of fire. Today it is desirable that certain fabrics such as curtains and drapes, decorative fabrics and sometimes upholstery and floor coverings in public buildings be flame resistant. It is highly desirable that certain clothing items such as children's pajamas be flame resistant. Many special purpose garments, such as welders' and steelworkers' overalls, fire fighters' clothing, and certain types of military clothing must be flame resistant.

Several factors generally affect flame resistance of a textile. First, the composition of the fibers must be considered. Natural fibers (such as cotton, flax, silk, wool), regenerated fibers (such as rayon), the man made fibers (such as nylons, vinyls, acrylics), and the inorganic fibers (such as glass and asbestos) have a varying combustibility and flame resistance depending on their chemical make-up. Of course, the weight and construction pattern of the fabric makes a significant difference in ease of burning. Lightweight, loose weave fabrics usually burn much faster than heavier fabrics.

The terms used in connection with flame resistant fabrics are sometimes confusing. "Fire resistance" and "flame resistance" are very often used in the same context as the terms "fireproof" and "flameproof." A textile which is flame resistant or fire resistant will not continue to burn or glow once the source of ignition has been removed although there will be some change in the physical and chemical characteristics. Fireproof or flameproof, on the other hand, refers to a material which is so resistant to flames that no appreciable change in physical or chemical properties is noted. Glass is an example of a fireproof material; however, if flame is applied long enough, it will melt.

Fabrics comprising mineral fibers such as asbestos or glass fibers, while flameproof, have several drawbacks. They are uncomfortable when in contact with the skin; they are highly heat conductive; and usually they must be blended with other fibers such as cotton to provide adequate strength and flexibility to the fabric. When the cotton or other fabric becomes burned or charred, the asbestos or glass fabric becomes very brittle and may fall apart. Glass fibers begin to lose their strength around 350°C and asbestos fibers dehydrate and become friable at about 550°C. In intense heat they melt away. Wool and other animal fiber fabrics have a relatively high ignition temperature and burn slowly. Wool has a bulky ash which is very brittle and, therefore, burnt wool falls apart easily. Cotton and other cellulose type fabrics are extremely flammable without chemical treatment which is of limited value.

Most man made fabrics melt rapidly when in contact with flames or at temperatures somewhat above 150°C. For example, polyethylene fabrics melt between 110° and 120°C; polyvinylidene chloride fabrics melt between 140° and 150°C; modacrylics (copolymers) melt at about 170°C; polyesters (terephthalic acid derivatives) melt at around 250°C; polyacrylonitrile (P.A.N.) fabrics soften at about 250°C. The common polyamides melt at low temperatures, for example, nylon 6 melts at 210°C and nylon 66 at 250°C. It should be understood that synthetic fibers lose their strength at temperatures much below their melting points.

Of the synthetic fabrics, only special polyamides, polyacrylonitriles and fluorocarbons have generally been considered flame resistant. There are special polyamide fabrics that are more resistant to a flame than the common nylons but only retain their strengths to temperatures of about 225°C and at about 325°C decompose into a friable char. The polyacrylonitriles shrink at elevated temperatures and might under unusual conditions be the source of poisonous gases. The fluorocarbon fabrics (polytetrafluoroethylene) give off a poisonous vapor above 200°C.

According to the teachings of this invention, there is provided a fabric having the following advantages: It is flame resistant. It does not melt. It has a low thermal conductivity. It is not uncomfortable when adjacent the skin as are mineral or woolen fabrics. The flexibility of the fabric is substantially equivalent to nylon. It chars producing carbon fibers with sufficient strength to maintain an integral protective cloth. It is chemically resistant and gives off no poisonous gases on heating.

THE INVENTION

Flame resistant fabrics according to this invention comprise synthetic fibers prepared from resin condensation products of phenols and aldehydes which can be fiberized and cured. (Hereafter, these synthetic fibers will be referred to as phenolic fibers.) The flame resistant fabrics may include blends of phenolic fibers with other fire resistant fibers such as wools, silks, polyamide fibers, polyacrylonitrile fibers, mineral and glass fibers, fluorocarbon fibers, and chemically treated cotton and rayon, among others. These fabrics may have additional wear resistance and better moisture regain. In some instances, less fire resistant fibers, for example, cottons, can be blended with phenolic fibers in the manufacture of fire resistant fibers. The amount of such fibers added and the manner of addition affects the properties of the composite fabric. Preferably, the more flammable fibers are added as coring in yarns. Alternatively, any suitable conventional technique for sheathing such fibers with phenolic fibers may be employed. Even small percentages of phenolic fiber will eliminate the dripping of molten polymer encountered in the burning of some fabrics. It is preferable that the fabrics according to this invention be at least 35% by weight phenolic fibers.

Phenolic resins are the condensation products resulting from the reaction between phenols and aldehydes. The various phenols and aldehydes that can be used to make phenolic resins are well-known. (See, for example, *Phenolic Resins* by David F. Gould, Reinhold Publishing Company, New York, 1959.) Primarily, phenolic resins are products of phenol and formaldehyde. The reaction of phenol itself with formaldehyde in the absence of any other reagent is slow, and a catalyst is almost always added to accelerate the reaction. The nature of the reaction products depends considerably upon whether an acidic or basic catalyst is used and upon the ratio of phenol to formaldehyde. When alkaline catalysts are used and the molar ratio of formaldehyde to phenol is greater than 1:1, the primary reaction products are phenol alcohols having reactive methylol groups which products are referred to as resoles. When acid catalysts are used and the molar ratio of formaldehyde to phenol is somewhat less than 1:1, the primary reaction products are probably also phenol alcohols but they rearrange rapidly to yield diphenyl methane derivatives to which the name novolac has been given. It has generally been accepted that phenol alcohols condense, with the elimination of water, to yield three dimensional macromolecules cross-linked by methylene bridges. Hence, resoles on heating polymerize resulting in an insoluble and infusible product. On the other hand, novolacs on heating remain viscous, and are permanently fusible. The novolac resins may be made rigid by curing with additional formaldehyde or with hexamethylene tetramine, among others, in the presence of an appropriate catalyst.

Phenolic fibers may be made from resoles and novolacs or a combination of each in varying proportions. Additives and modifiers, either reactive or nonreactive, can be used to alter the fiber characteristics either for attenuation or their end use properties. When resoles are used as a starting material, they should be dried prior to fiberization. The fibers are drawn from the viscous mass and made infusible by the careful and gentle application of heat. No additional methylol groups or catalysts are required for a complete cure. However, the fibers remain tacky until cured and must be kept from contact with each other or they will coalesce. The addition of a novolac will decrease the tendency to coalesce.

When a pure novolac is fiberized no coalescence occurs even though the fibers are tightly wound on a spool. Curing of novolac fibers can be accomplished quite readily. The curing cycle is determined by the average molecular weight of the resin. The manufacture of phenolic fibers from novolacs is described in copending U.S. patent application Ser. No. 710,292, filed Mar. 4, 1968, now U.S. Pat. No. 3,650,102, issued Mar. 21, 1972, entitled "Fibers from Novolacs and Method for Their Production" by Economy and Clark.

Fabrics may be woven or knitted from continuous strands of phenolic fiber or may be woven or knitted from yarns which are prepared from phenolic fiber staples. Staples are made into yarn by the common textile making practices of opening, picking, carding, breaker drawing, finisher drawing, roving, spinning, twist setting and winding. When other fibers are to be blended with the phenolic fibers they can either be added as staples prior to the picking operation, introduced as a core yarn or during weaving as warp or fill. Worsted systems comprising gilling, pin drafting, roving, spinning, twist setting and winding are also suitable for preparing yarn.

The following tests were performed to demonstrate the superior fire resistance of phenolic fiber fabrics. In order to eliminate the variables such as type and tightness of weave, staple fibers were tested. Two grams of staples of the following fibers were formed into balls having a diameter of two inches. The fibers compared were cotton, rayon, wool, high temperature polyamide, polyacrylonitrile and phenolic fibers. The test balls were placed on a screen 1 inch above the blue portion of a gas flame. The burner had a capacity of 10,500 B.T.U.'s per hour and consisted of 155 orificed cones. The height of flame caused by combustion of the fiber balls and the change of weight and shape after a 10 second test and a 60 second test are given in the following table.

| Flame Test on Fiber Staples | | | | | | |
|---|---|---|---|---|---|---|
| Type of Fiber | Cotton | Rayon | Wool | High Temp. Polyamide | Polyacrylonitrile | Phenolic |
| Ht. of Flame, in. | 9 | 15 | 15 | 7 | 12 | 0 |
| Size of Ball, in. | | | | | | |
| After 10 sec. | 1 | 1 | 1 | 1 | 0.7 | 2.5 |
| After 60 sec. | | | | 0.7 | | 2.5 |
| Wt. of Ball, gms. | | | | | | |
| After 10 sec. | 0.75 | 0.61 | 0.82 | 1.69 | 1.00 | 1.75 |
| After 60 sec. | | | | 1.25 | | 1.46 |

The table establishes that phenolic fibers have superior flame resistance to the other fibers tested. Surprisingly, phenolic fibers did not produce a flame on ignition. Most important, phenolic fibers retain their shape, that is, they shrink only slightly and char or carbonize and hence, when woven into a fabric, provide protection even after having been subjected to a direct flame. All other fibers shrank. (The tabulated data show that the balls of phenolic staples are larger after testing. This was due to unraveling of the balls and not to expansion of the fibers which actually shrink slightly. On the other hand, the remaining fiber balls shrank due to considerable shrinking or melting of the fibers themselves.) In a similar test, glass and asbestos fibers were compared with phenolic fibers. Of course, the mineral fibers did not ignite; however, after about 20 seconds in the flame they melted away.

Phenolic fiber fabrics provide more protection against heat in fire fighting clothes than asbestos or glass fabric because the phenolic fibers have a thermal conductivity only 1/5 of that of mineral fibers.

Phenolic fiber fabrics have been found to be resistant even to burning liquids in direct contact with them if coated with a liquid impenetrable coating. Suitable coatings would comprise, for example, firm and flexible layers of phenolic resin or fluorocarbon resin.

It should be understood that this invention is not limited to fabrics made 100% from phenolic fibers. Considerable advantage can be gained by combining these fibers with other fire resistant fibers such as wool, special polyamides, polyacrylonitrile fibers, and asbestos or glass. By blending the phenolic fibers with a natural fiber such as wool, the fabric can be provided with increased moisture regain which contributes to the comfort of the wearer of the fabric. By blending with special polyamides and polyacrylonitriles, the wear resistance of the fabric can be increased. Even though the polyamides have a tendency to melt, the structure provided by the phenolic fibers will retain the melt in place until it chars. The resistance of phenolic fiber fabrics against longer time exposure to intermediate temperatures (200°–800°C) can be improved by blending the phenolic fibers with mineral fibers such as glass, asbestos or boron nitride. In certain instances, even cotton, rayon, polyester fibers, polyolefin fibers, polyvinyl fibers, and other less fire resistant fibers can be advantageously blended with phenolic fibers to provide a fire resistant fabric.

Having thus described our invention, what is desired to be covered by Letters Patent is as follows:

1. A flame resistant fabric comprising infusible fibers of cured resin condensation products of phenols and aldehydes blended with fibers selected from the group consisting of animal fibers, polyamide fibers, polyacrylonitrile fibers, flurocarbon fibers, glass fibers, mineral fibers, cotton fibers, rayon fibers, polyester fibers, polyolefin fibers, polyvinyl fibers, and mixtures thereof.

2. A fabric as set forth in claim 1 wherein said infusible fibers of cured resin condensation products of phenols and aldehydes are novoloid fibers.

3. A fabric as set forth in claim 1 wherein said infusible fibers of cured resin condensation products of phenols and aldehydes comprise at least 35 percent by weight of the fibers in the fabric.

4. A fabric as set forth in claim 3 wherein said infusible fibers of cured resin condensation products of phenols and aldehydes are novoloid fibers.

5. A fabric as set forth in claim 4 wherein said infusible fibers of cured resin condensation products of phenols and aldehydes are blended with polyamide fibers.

6. A fabric as set forth in claim 5 wherein said infusible fibers of cured resin condensation products of phenols and aldehydes are novoloid fibers.

* * * * *